United States Patent
Vashi

(10) Patent No.: US 10,077,006 B2
(45) Date of Patent: Sep. 18, 2018

(54) METHOD AND SYSTEM FOR SECURELY HOLDING AN OBJECT IN A VEHICLE

(71) Applicant: Honda Motor Co., Ltd., Tokyo (JP)

(72) Inventor: Harinkumar Anilkumar Vashi, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 130 days.

(21) Appl. No.: 15/290,278

(22) Filed: Oct. 11, 2016

(65) Prior Publication Data

US 2018/0099621 A1 Apr. 12, 2018

(51) Int. Cl.
*B60R 11/02* (2006.01)
*B60R 11/00* (2006.01)

(52) U.S. Cl.
CPC ........... *B60R 11/02* (2013.01); *B60R 11/0241* (2013.01); *B60R 2011/0007* (2013.01)

(58) Field of Classification Search
CPC ................ B60R 11/02; B60R 11/0241; B60R 2011/0007
USPC ........................................................ 701/49
See application file for complete search history.

(56) References Cited

U.S. PATENT DOCUMENTS

| | | |
|---|---|---|
| 5,060,260 A | 10/1991 | O'Connell |
| 8,202,114 B2 | 6/2012 | Zilmer et al. |
| 8,393,584 B2 | 3/2013 | Burns |
| 9,137,498 B1 | 9/2015 | L'heureux et al. |
| 9,270,130 B2 | 2/2016 | Arai et al. |
| 9,764,693 B1* | 9/2017 | Biondo ............... B60R 11/0241 |
| 2003/0190936 A1 | 10/2003 | Fan et al. |
| 2009/0125195 A1* | 5/2009 | Spingler .................. B60R 7/04 701/49 |
| 2010/0288895 A1 | 11/2010 | Shamie |
| 2013/0106346 A1 | 5/2013 | Salter et al. |
| 2015/0126248 A1 | 5/2015 | Lachnitt |

FOREIGN PATENT DOCUMENTS

DE 19719512 11/1998

OTHER PUBLICATIONS

"Transform", Tangible Media Group, https://vimeo.com/122370241 (Year: 2015).*

* cited by examiner

*Primary Examiner* — Krishnan Ramesh
(74) *Attorney, Agent, or Firm* — Rankin, Hill & Clark LLP

(57) ABSTRACT

A method and system for securely holding an object in a vehicle that include providing a command to enable an automated holder. The method and system also include determining a physical profile of the object placed upon a surface of the automated holder upon enablement of the automated holder, wherein determining the physical profile includes evaluating information pertaining to physical dimensions of the object. The method and system further include modifying a configuration of the surface of the automated holder to securely hold the object based on the physical profile of the object.

20 Claims, 7 Drawing Sheets

METHOD AND SYSTEM FOR SECURELY HOLDING AN OBJECT IN A VEHICLE

BACKGROUND

Many drivers and passengers place various types of objects within a center console of an interior of a vehicle. In many vehicles, the center console/center panel region may include a tray and/or a compartment that may be utilized to hold the objects. A major limitation for the tray and/or compartment is that objects tend to move and fall as a result of a movement of the vehicle. Additionally, a limitation of the compartment is that in many occasions there is a requirement of opening of a lid to place objects or remove objects from the compartment. Consequently, both of these configurations may result in damage to the objects, driver distraction, and/or occupant inconvenience as objects may fall or are not easily accessible.

Moreover, the mounting or holding of portable electronic devices (e.g., cell phones, smart phones, tablets, MP3 players) within vehicles has become more complicated over time. In particular, with the advent of more models of portable electronic devices of numerous sizes and form factors, numerous types of device mounts may be required to mount or hold these devices within vehicles. For instance, such mounts include claps, cradles, or holders only configured for a limited amount of portable electronic device form factors. Additionally, such mounts/holders may only hold certain types of portable electronic devices. In many instances, the movement of the vehicle and the weight of the portable electronic device may cause the mount/holder to fall or cause the portable electronic device to detach/slide from the mount/holder resulting in the portable electronic device falling to the ground, which may result in damage to the portable electronic device, driver distraction, and/or occupant inconvenience.

BRIEF DESCRIPTION

According to one aspect, a method for securely holding an object in a vehicle that includes providing a command to enable an automated holder. The method also includes determining a physical profile of the object placed upon a surface of the automated holder upon enablement of the automated holder, wherein determining the physical profile includes evaluating information pertaining to physical dimensions of the object. The method further includes modifying a configuration of the surface of the automated holder to securely hold the object based on the physical profile of the object.

According to a further aspect, a system for securely holding an object in a vehicle that includes a memory storing instructions when executed by a processor cause the processor to provide a command to enable an automated holder. The system also causing the processor to determine a physical profile of the object placed upon a surface of the automated holder upon enablement of the automated holder, wherein determining the physical profile includes evaluating information pertaining to physical dimensions of the object. The system further causing the processor to modify a configuration of the surface of the automated holder to securely hold the object based on the physical profile of the object.

According to still another aspect, a method for securely holding a portable electronic device in a vehicle that includes providing a command to enable an automated holder. The method also includes determining a physical profile of the portable electronic device placed upon a surface of the automated holder upon enablement of the automated holder, wherein determining the physical profile includes evaluating information pertaining to physical dimensions of the portable electronic device. The method further includes modifying a configuration of the surface of the automated holder to securely hold the portable electronic based on the physical profile of the portable electronic device.

DETAILED DESCRIPTION

Figure 1:
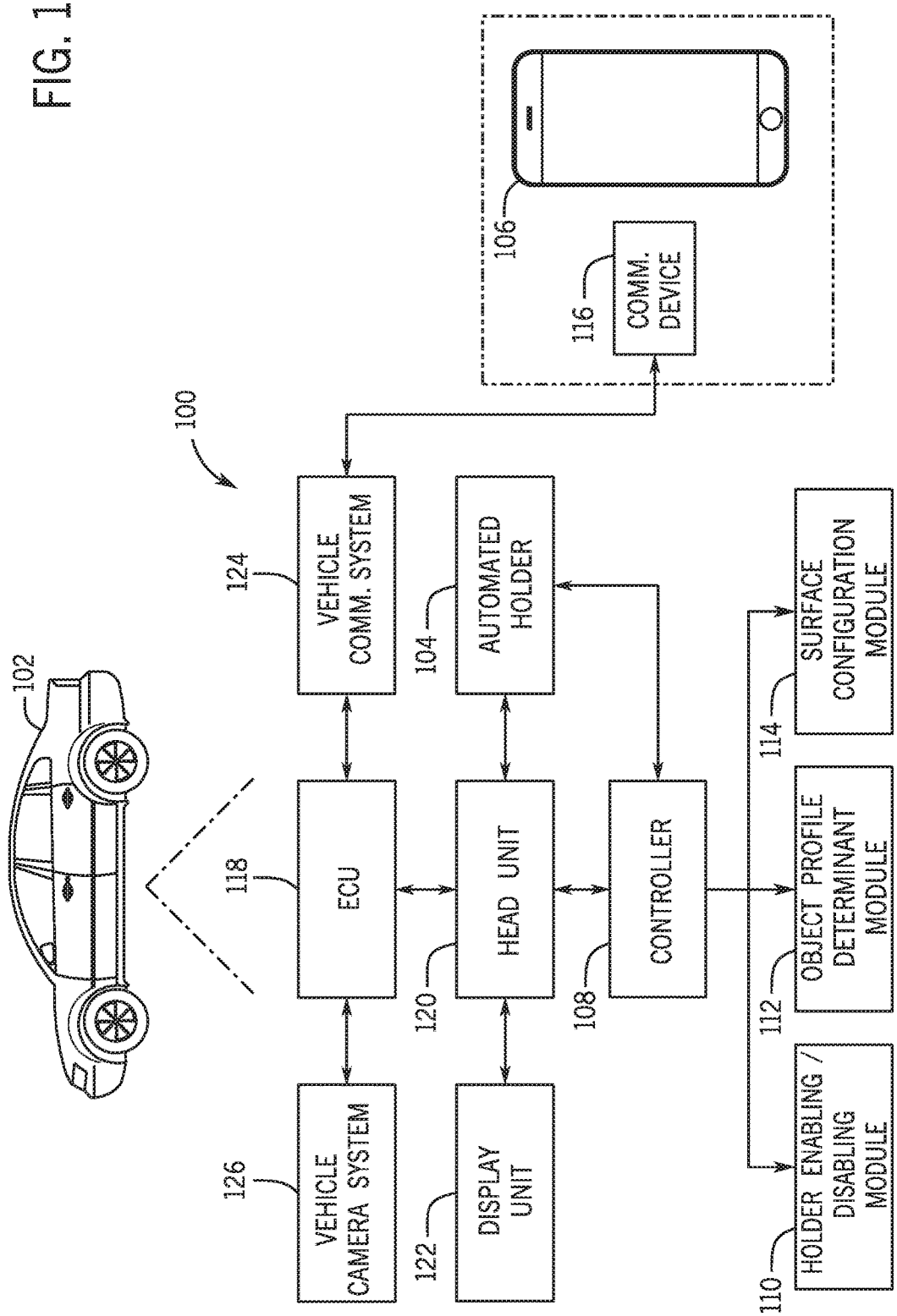
FIG. 1 is a schematic view of an automated holding system for securely holding an object (not shown) in a vehicle, according to an exemplary embodiment.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "database", as used herein may refer to table, a set of tables, and a set of data stores and/or methods for accessing and/or manipulating those data stores. Some databases may be incorporated with a disk as defined above.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable electronic device", as used herein, is a computing device typically having a display screen with user input (e.g., touch, keyboard) and a processor for computing. Portable electronic devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

Referring now to the drawings, wherein the showings are for purposes of illustrating one or more exemplary embodiments and not for purposes of limiting the same, FIG. 1 is a schematic view of an automated holding system 100 for securely holding an object (not shown) in a vehicle 102, according to an exemplary embodiment. In an exemplary embodiment, an environment of the automated holding system 100 includes the vehicle 102 that houses an automated holder 104. In an exemplary embodiment, the automated holder 104 may be utilized at a location within the vehicle 102 to hold one or more objects that may include a portable electronic device 106.

The portable electronic device 106 of the system 100 may be manufactured by various manufacturers and may be configured in a plurality of form factors, designs, and/or configurations. In some embodiments, the portable electronic device 106 may include a protective encasement (not show) that may encase the portable electronic device 106 and may be configured in a plurality of form factors, designs, and/or configurations.

In one embodiment, the portable electronic device 106 may include a communication device 116 that is provided to communicate with one or more components of the automated holding system 100. The communication device 116 may include, but is not limited to, one or more transmitters (not shown), one or more antennas (not shown), and additional components (not shown) that may be used for wired and wireless computer connections and communications via various protocols. In one or more embodiments, the communication device 116 may be used by the portable electronic device 106 to bilaterally communicate amongst each other through a (GSM), general packet radio service (GPRS), Wi-Fi®, WiMax®, Bluetooth®, or LTE® wireless connection that may be configured to provide data connections to support the exchange of data signals between the portable electronic device 106 and one or more components of the vehicle 102.

With continued reference to FIG. 1, the automated holder 104 may include a controller 108 (i.e., processor) that may operate one or more components of the automated holder 104. In one or more embodiments, the controller 108 of the automated holder 104 may generally include memory, an interface circuit, and bus lines (all not shown), for transferring data, sending command for respectively controlling an overall operation of the automated holder 104. In some embodiments, the controller 108 may be operably connected to a separate memory (not shown) that may store data that is utilized by the controller 108 to operate the automated holder 104. In one or more embodiments, the controller 108 may be operably connected with the components of the automated holder 104 in addition to the components of the vehicle 102.

The controller 108 may be operably connected to a plurality of modules that may be operated by one or more sub-processors (not shown) of the controller 108 and that may send and receive signals to/from the controller 108 and/or amongst one another to operate the automated holder 104. In an exemplary embodiment, the plurality of modules may include a holder enabling/disabling module 110, an object profile determinant module 112, and a surface configuration module 114. In an exemplary embodiment, the holder enabling/disabling module 110 may evaluate one or more signals received by the controller 108 from the one or more components of the vehicle 102 and/or one or more components of the automated holder 104 and may send command signal(s) to the controller 108 to enable or disable the automated holder 104. Upon the automated holder 104 being enabled, the object profile determinant module 112 may evaluate one or more signals received from the one or more components of the vehicle 102 and/or one or more components of the automated holder 104 to determine a physical profile of the object(s) placed upon the automated holder 104.

In one embodiment, the physical profile of the object(s) may include information pertaining to the physical dimensions of the object(s). More specifically, the physical profile may include an integration of data that includes one or more of the length, width, height, depth, weight, density, form factor, and/or additional data pertaining to the shape and/or physical configuration of the object(s). As will be described in more detail below, upon the object profile determinant module 112 determining the physical profile of the object(s) placed upon the automated holder 104, the surface configuration module 114 may send respective commands to change the configuration of the automated holder 104 in order to securely hold the object(s) within the vehicle 102 based on the determined physical profile of the object(s).

Figure 2A:
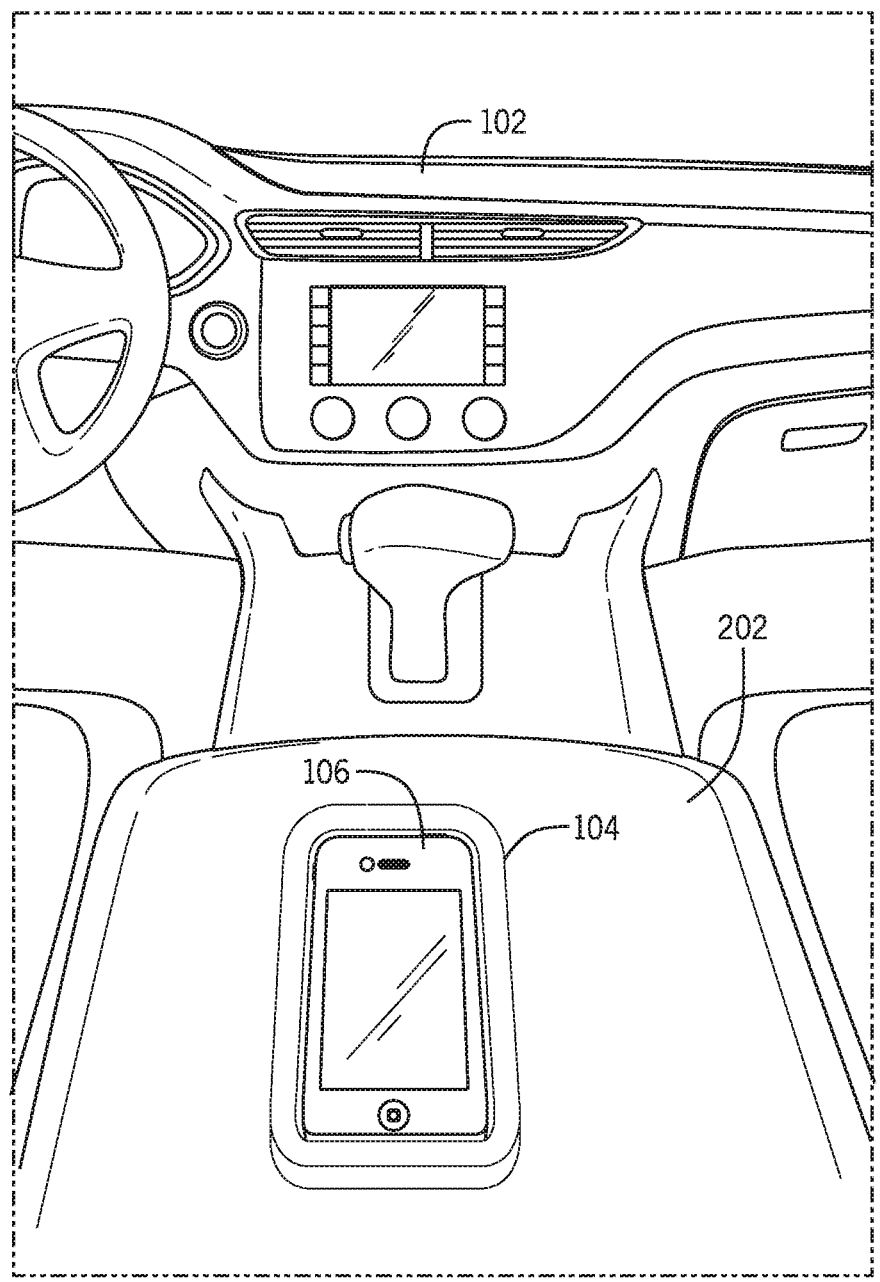
FIG. 2A is an exemplary illustration of an automated holder being utilized within the vehicle to securely hold a portable electronic device according to an exemplary embodiment.

FIG. 2A is an exemplary illustration of the automated holder 104 being utilized within the vehicle 102 to securely hold the portable electronic device 106. As shown in the embodiment of FIG. 2A, the automated holder 104 may be disposed in a vertical direction within a center console 202 within the vehicle 102 and may be utilized to hold the object(s) such as the portable electronic device 106 in a vertical positon within the vehicle 102. However, as will be appreciated by those skilled in the art, the automated holder 104 may be disposed in other locations within the vehicle 102 to hold the object(s) at various angles of inclination within the vehicle 102. For example, in some embodiments, the automated holder 104 may be disposed in a horizontal direction within a front panel within the vehicle 102.

Figure 2B:
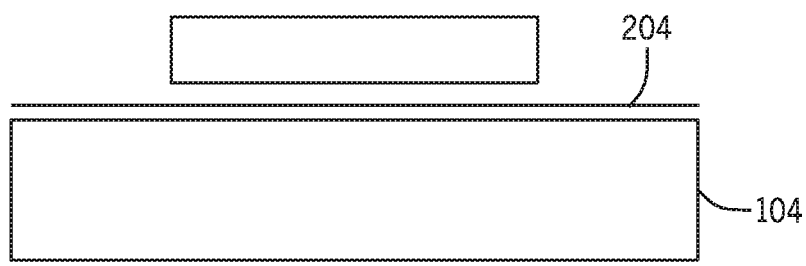
FIG. 2B is a schematic end profile view of an exemplary embodiment of the automated holder of FIG. 2A configured in a vertical position while in a disabled state according to an exemplary embodiment.

FIG. 2B is a schematic end profile view of an exemplary embodiment of the automated holder 104 of FIG. 2A configured in a vertical position while in a disabled state according to an exemplary embodiment. As discussed in more detail below, the automated holder 104 may include a surface 204 that may be utilized by a user (not shown) to place the object(s) upon. As an illustrative example, the user may place the object(s) on the surface 204 within the center console of the vehicle 102 prior to driving the vehicle 102.

Figure 2C:
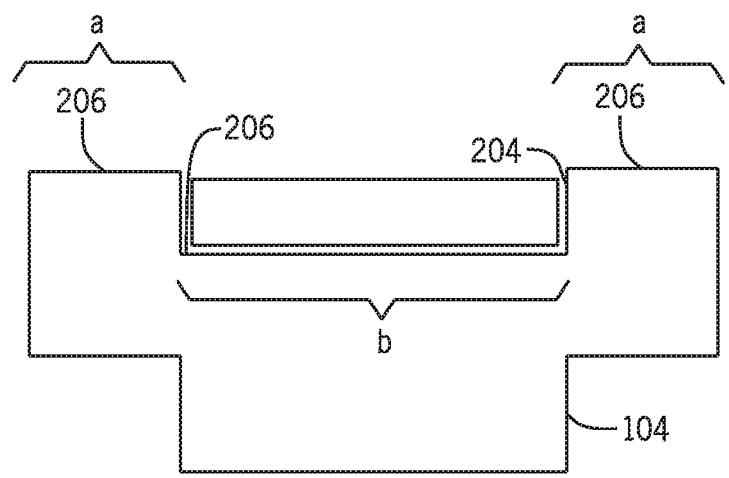
FIG. 2C is a schematic end profile view of an exemplary embodiment of the automated holder of FIG. 2A configured in the vertical positon while in an enabled state according to an exemplary embodiment.

FIG. 2C is a schematic end profile view of an exemplary embodiment of the automated holder 104 of FIG. 2A configured in the vertical positon while in an enabled state according to an exemplary embodiment. In an exemplary embodiment, when the automated holder 104 is in the enabled state, power may be provided to the components of the automated holder by a power source (not shown) to operate the components. In one embodiment, the surface 204 may include a plurality of surface portions 206 (e.g., labeled as 'a' and 'b' within FIG. 2C). When modifying the configuration of the surface 204, one or more of the plurality of surface portions 206 may be ascended (e.g., raised) or descended (e.g., lowered) when the automated holder 104 is enabled to encase one or more sides of the object(s) within the automated holder 104 in order to securely hold the object(s) within the vehicle 102.

The vehicle 102 of the automated holding system 100 may generally include an electronic control unit 118 (ECU 118), a head unit 120, a display unit 122, a vehicle communication system 124, and a vehicle camera system 126. In one or more embodiments, the ECU 118 may include internal processing memory, an interface circuit, and bus lines (all not shown) for transferring data, sending commands, and communicating with the other vehicle components. Generally, the ECU 118 includes a processor and memory (not shown). In some embodiments, the ECU 118 also includes a communications device (not shown) for sending data internally in the vehicle 102 and externally to connected devices.

In one embodiment, the head unit 120 of the vehicle 102 may be operably controlled by the ECU 118 to provide output of one or more signals to one or more vehicle systems (not shown) and components within the vehicle 102 including the automated holder 104. The head unit 120 of the vehicle 102 may be operably connected to the display unit 122. The display unit 122 may provide a human machine interface (HMI) to provide a user (e.g., driver, passenger) various types of interfaces. The display unit 122 may include a display screen (not shown) that may be a touch screen that may be used to provide touch inputs to user interfaces provided by the head unit 120.

In one embodiment, a user interface (not shown) associated with the automated holder 104 may be provided to the user through the display unit 122. The user interface may provide the user with an ON/OFF user input button that provides the user with a functionality to turn on or turn off the automated holder 104 in order to hold or not hold the object(s) that the user may place upon the automated holder 104. In one embodiment, upon the user inputting the ON/OFF user input button, the head unit 120 may send a corresponding ON/OFF signal(s) to the controller 108 to be evaluated by the holder enabling/disabling module 110. Upon receipt of the corresponding signal(s) from the head unit 120, the signal(s) may be utilized to enable or disable the automated holder 104 based on evaluation of the signal(s).

In an exemplary embodiment, the head unit 120 may also be operably connected to the vehicle communication system 124 of the vehicle 102. The vehicle communication system 124 may be an external interface for mobile communication that facilitates the sending and receiving of data between the vehicle 102 and the portable electronic device 106. For example, if the user utilizes a hands-free connection within the vehicle 102 each time the vehicle 102 is enabled, the communication device 116 of the portable electronic device 106 may send/receive one or more data signals to/from the vehicle communication system 124. In one embodiment, upon the portable electronic device 106 sending and receiving data to/from the vehicle communication system 124, the head unit 120 may send a device connection signal(s) to the controller 108 to be evaluated by the holder enabling/disabling module 110. Also, upon the portable electronic device 106 no longer sending and receiving data to/from the vehicle communication system 124, the head unit 120 may send a device disconnection signal(s) to the controller 108 to be evaluated by the holder enabling/disabling module 110. Upon receipt of the device connection signal(s) from the head unit 120, the automated holder 104 may be enabled based on the signal(s). Similarly, upon receipt of the device disconnection signal(s) from the head unit 120, the automated holder 104 may be disabled based on evaluation of the signal(s).

In one or more embodiments, the ECU 118 may communicate with an ignition system (not shown) of the vehicle 102 to determine when one or more ignition modes of the ignition system (e.g., ACC mode, battery mode, engine ON mode) is enabled or disabled by the user (e.g., by utilizing a vehicle key or push button start/stop). Upon determining the enabling or disabling of the one or modes of the ignition system, the ECU 118 may communicate corresponding data to the head unit 120 that signifies an enabling or disabling of the modes of the vehicle ignition system. In one embodiment, the head unit 120 may evaluate the data and determine when the vehicle ignition system is enabled from a disabled state, or disabled from an enabled state. In other words, the head unit 120 may determine when the ignition system is utilized to enable any of the ignition modes of the vehicle 102 or to disable all of the ignition modes of the vehicle 102. Upon determining that the vehicle ignition system is enabled from the disabled state, or disabled from the enabled state, the head unit 120 may send a corresponding vehicle enabling/disabling signal(s) to the controller 108 to be evaluated by the holder enabling/disabling module 110. As discussed below, upon receipt of the corresponding vehicle enabling/disabling signal(s) from the head unit 120, the automated holder 104 may be enabled or disabled based on evaluation of the signal(s).

In an exemplary embodiment, the vehicle 102 may additionally include a vehicle camera system 126 that may be operably connected to the ECU 118 and the head unit 120. The vehicle camera system 126 may include one or more cameras (not shown) that are positioned at various locations within the vehicle 102. The one or more cameras may capture images within and/or outside of the vehicle 102 including images of the area of the vehicle 102 containing the automated holder 104. In particular, the one or more cameras of the vehicle camera system 126 may be configured to capture images of the automated holder 104.

In one embodiment, the vehicle camera system 126 may capture images of the object(s) being placed upon the surface 204 of the automated holder 104. The vehicle camera system 126 may utilize camera logic to determine that object(s) is being placed upon the surface 204 of the automated holder 104 and may further utilize the camera logic to determine the physical dimensions (e.g., length, width, height, etc.) of the one or more objects placed upon the surface 204 of the automated holder 104.

In one embodiment, upon determining that images of the objects being placed upon the surface 204 have been captured and further determining the physical dimensions of the object(s), the vehicle camera system 126 may send image data signal(s) to the controller 108 of the automated holder 104 that includes data that pertains to the object(s) to be evaluated by the holder enabling/disabling module 110, and/or the object profile determinant module 112. Upon receipt of the image data signal(s) from the vehicle camera system 126, the automated holder 104 may be enabled based on the evaluation of the signal(s). As discussed in more detail below, the signals(s) including the data pertaining to the object(s) may also be evaluated to determine the physical profile of the object(s) based on the evaluation of the signal(s).

In one or more embodiments, the one or more cameras of the vehicle camera system 126 may be configured to capture images of the object(s) placed upon the surface 204 of the automated holder 104 being removed from the surface 204 by the user. The vehicle camera system 126 may utilize camera logic to determine that the object(s) is being removed from the surface 204 by the user. Upon making such a determination, the vehicle camera system 126 may send corresponding image data signal(s) to the controller 108 to be evaluated by the holder enabling/disabling module 110. Upon receipt of the image data signal(s) from the vehicle camera system 126, the automated holder 104 may be disabled based on the evaluation of the signal(s).

In one embodiment, the one or more cameras of the vehicle camera system 126 may be configured to capture images of seats of the vehicle 102 to provide images of any occupant(s) of the vehicle 102. The vehicle camera system 126 may utilize the camera logic to determine if there are any occupant(s) present within the vehicle 102. Upon determining that the occupant(s) is present within the vehicle 102, the vehicle camera system 126 may send the image data signal(s) that includes data that pertains to the presence of the occupant(s) to the controller 108 to be evaluated by the holder enabling/disabling module 110. For example, if one or more occupants enter and occupy the vehicle 102, the vehicle camera system 126 may send the respective image data signal(s). Upon receipt of the image data signal(s) from the vehicle camera system 126, the automated holder 104 may be enabled based on the evaluation of the signal(s).

Figure 3A:
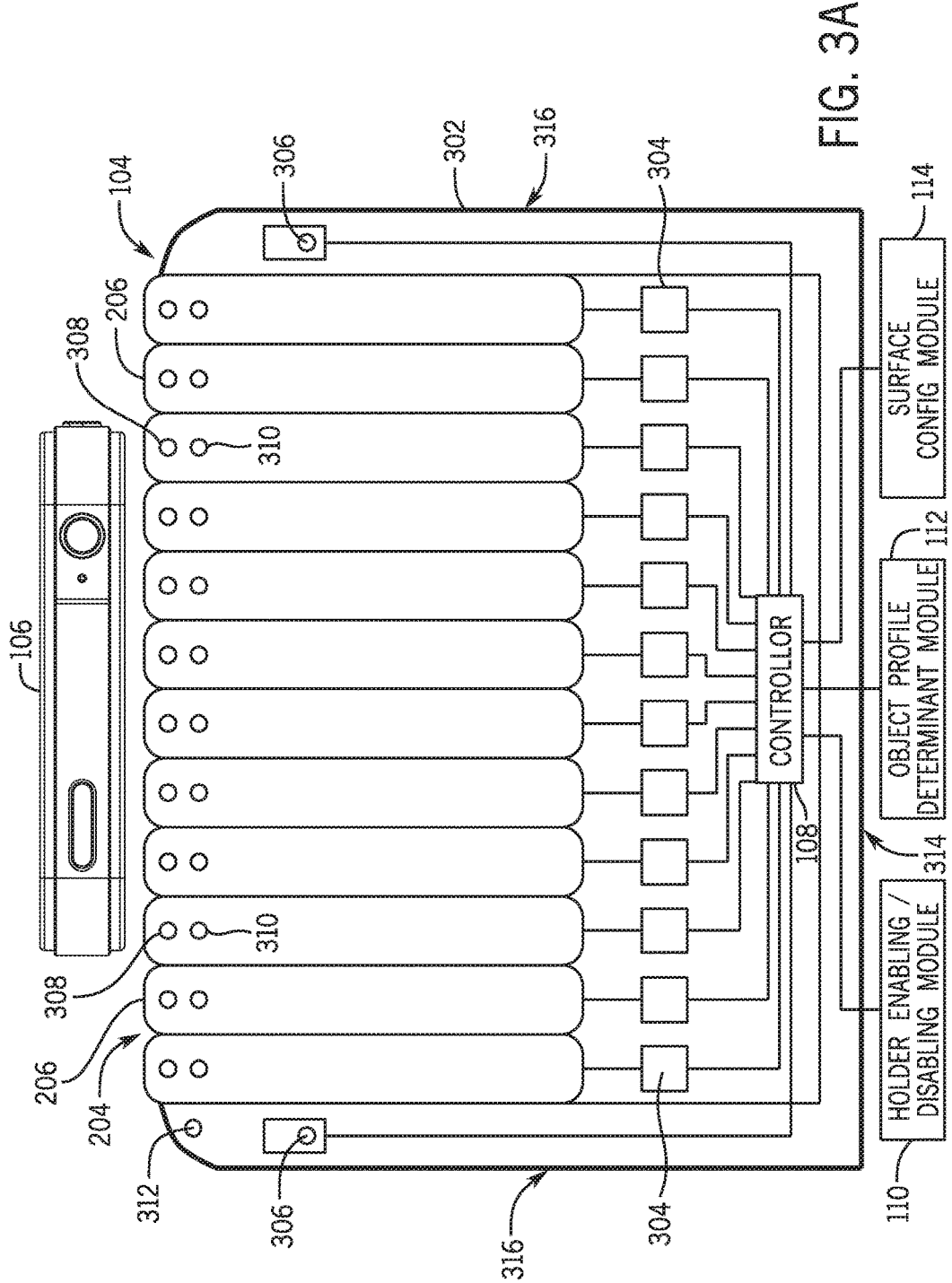
FIG. 3A is an enlarged schematic sectional view of an exemplary embodiment of the automated holder of FIG. 2A in the disabled state according to an exemplary embodiment.

FIG. 3A is an enlarged schematic sectional view of an exemplary embodiment of the automated holder 104 of FIG. 2A in the disabled state according to an exemplary embodiment. FIG. 3A illustrates the portable electronic device 106 as the object being placed upon the surface 204 of the automated holder 104. However, it is appreciated that the disclosure related to FIG. 3A may apply to numerous types of objects that may be placed upon the surface 204 of the automated holder 104.

In an exemplary embodiment, in addition to the surface 204 and the plurality of surface portions 206, the automated holder 104 of the automated holding system 100 may include a casing 302, a plurality of actuators 304, one or more proximity sensors 306, one or more photoelectric sensors 308, one or more weight sensors 310, and an ON/OFF switch button 312.

It is to be appreciated that in some embodiments, the automated holder 104 may include a charging apparatus (not shown) that may be utilized to charge the portable electronic device 106 as it is being held on the surface 204 of the automated holder 104. For instance, the surface 204 may include one or more induction coils (not shown) that may be utilized to charge the portable electronic device 106 via an induction charging technology. In some embodiments, the automated holder 104 may include a communication device (not shown) that can be used to connect at least one computer (not shown) through an internet cloud (not shown) to provide communications between the portable electronic device 106 to send and receive one or more data signals to and from the automated holder 104. However, the exemplary embodiments discussed herein relate mainly to the architecture and operation of the automated holder 104 to securely hold the object(s) that may include the portable electronic device 106 within the vehicle 102.

With continued reference to FIG. 3A, in one embodiment, the casing 302 of the automated holder 104 may include a base portion 314 and side portions 316. The base portion 314 and/or the side portions 316 may be attached and secured to one or more portions of an interior of the vehicle 102 by one or more attachment members (not shown) that may include screws, clasps, clamps, adhesive materials, brackets, and the like that holds the casing 302 and consequently the automated holder 104 in place to be disposed at a location within the vehicle 102. For example, the attachment member may be attached to the base portion 314 and within the center console of the vehicle 102 to dispose the automated holder 104 in a horizontal direction within the center console of the vehicle 102, as illustrated in FIG. 2. In some embodiments, the casing 302 may include a removable or retractable automated cover (not shown) that may be included on the opposite side of the base portion 314 to cover the surface 204 of the automated holder 104 when there is no object determined to be in proximity or in contiguity to the surface 204.

In one or more embodiments, upon being enabled, the automated holder 104 may be configured to receive power to operate from a general power source (not shown) (e.g., vehicle battery) of the vehicle 102. In alternate embodiments, the automated holder 104 may be configured to receive power to operate from a dedicated power source (not shown) that may be configured within the vehicle 102 and/or the casing 302 of the automated holder 104. The controller 108 may control distribution of the power to the various components of the automated holder 104. For example, upon enabling the automated holder 104, the controller 108 may control distribution of power to one or more of the plurality of actuators 304 to ascend or descend one or more surface portions of the plurality of surface portions 206 of the surface 204 to securely hold the object(s).

In an exemplary embodiment, the surface 204 of the automated holder 104 may be configured of one or more types of materials, including but not limited to, vinyl, plastic, wood, metal, composite, fabric lined, leather lined, and the like. In some embodiments, the surface 204 may be configured of one or more types of materials that are utilized within one or more locations within the vehicle 102. For example, if the center console of the vehicle 102 includes a wood grain surface, the surface 204 may also be configured of wood grain materials. In some embodiments, the surface 204 may include a slide resistant material that allows the one or more objects placed on the surface 204 to be slide resistant to further counter the movement of the vehicle 102.

The surface 204 may be configured in a variety of different sizes to accommodate various types of objects. For example, the surface 204 may be configured in various shapes, sizes, and dimensions to accommodate various types of portable electronic device form factors. In an alternate embodiment, the surface 204 may be detachable from the automated holder 104 allowing a user to attach a different sized surface and associated components (e.g., plurality of actuators 304, plurality of surface portions 206) to be operably connected to the controller 108 of the automated holder 104. As discussed in more detail below, in an exemplary embodiment upon determining the physical profile of the object(s) placed upon the surface 204 by the controller 108, one or more of the plurality of surface portions 206 may be ascended or descended from a default position (e.g., all of the plurality of surface portions 206 are at a unitary level) to securely hold (e.g., grasp, mount) the object(s) upon the surface 204 of the automated holder 104.

In one or more embodiments, the plurality of surface portions 206 may include a plurality of surface layers (not shown) that are disposed atop each of the plurality of surface portions 206 and are ascended or descended by the ascending or descending of one or more respective surface portions of the plurality of surface portions 206. The plurality of surface portions 206 and/or the plurality of surface layers may be configured in various sizes that may depend on the overall size of the surface 204. In one embodiment, the plurality of surface portions 206 and/or the plurality of surface layers may be configured to align without any visible gaps and/or sections when they are within a unitary level of ascension/descension or in the default position. For purposes of simplicity, the disclosure related to embodiments discussed below that pertain to the plurality of surface portions 206 may also apply to embodiments that include the plurality of surface layers that are disposed atop each of the plurality of surface portions 206.

Figure 3B:
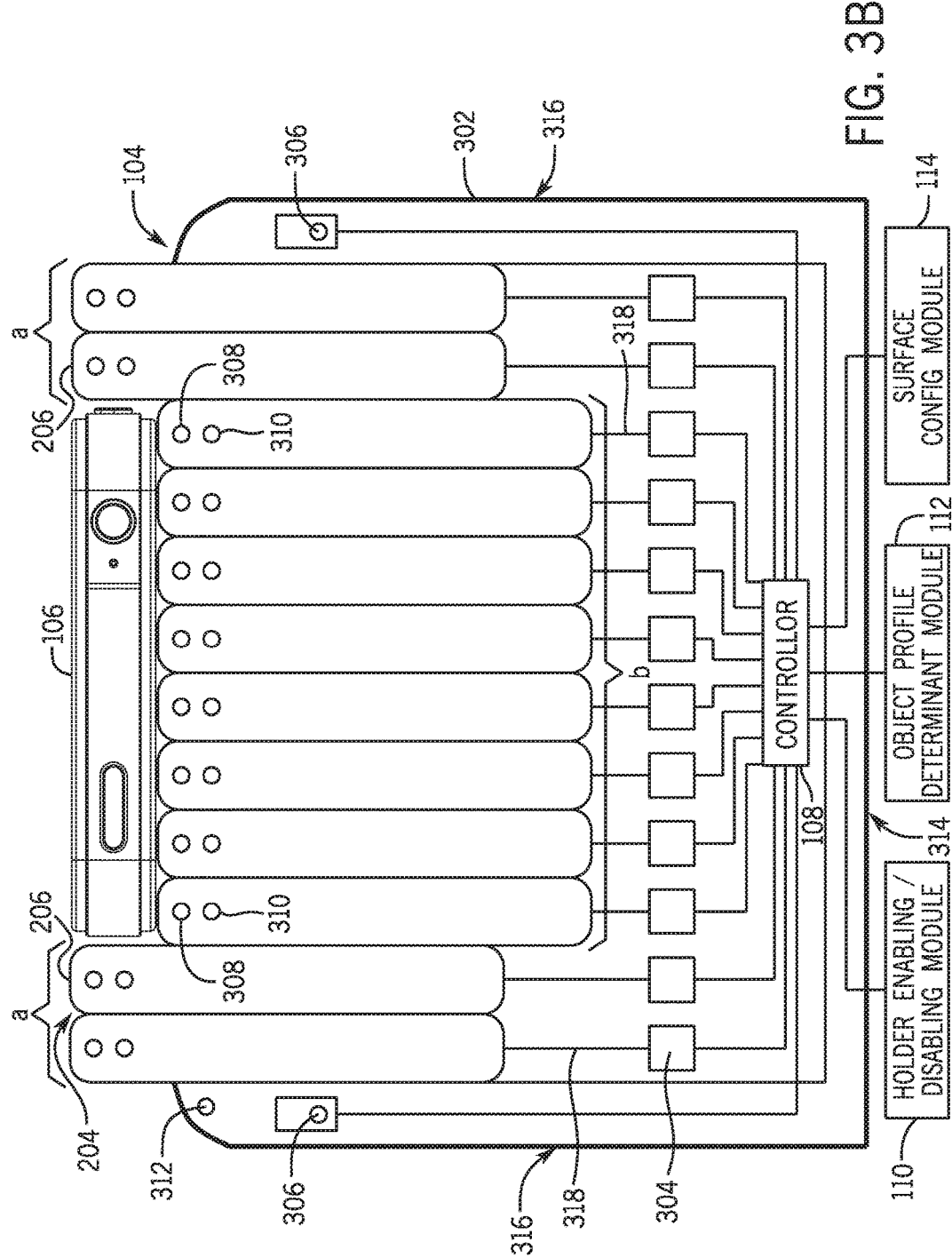
FIG. 3B is an enlarged schematic cross-section view of an exemplary embodiment of the automated holder of FIG. 2B in the enabled state to mechanically ascend or descend one or more of a plurality of surface portions according to an exemplary embodiment.

FIG. 3B is an enlarged schematic cross-section view of an exemplary embodiment of the automated holder 104 of FIG. 2B in the enabled state to mechanically ascend or descend one or more of a plurality of surface portions 206 according to an exemplary embodiment. FIG. 3B illustrates the portable electronic device 106 as the object being placed upon the surface 204 of the automated holder 104. However, it is appreciated that the disclosure related to FIG. 3B may apply to numerous types of objects that may be placed upon the surface 204 of the automated holder 104.

As discussed in more detail below, the surface configuration module 114 may send one or more signals to mechanically ascend or descend one or more of the plurality of surface portions 206 when the portable electronic device 106 is placed upon the surface 204 of the automated holder 104 to securely hold the portable electronic device 106. In an exemplary embodiment, when the automated holder 104 is enabled, and the physical profile of the object(s) placed on the surface 204 is determined, one or more of the plurality of surface portions 206 (labeled as 'a') may be ascended to form a holder to securely hold the object(s) upon the surface 204 while one or more of the plurality of surface portions 206 (labeled as 'b') may remain in a default positon. In an alternate embodiment, when the automated holder 104 is enabled, and the physical profile of the one or more objects placed on the surface 204 are determined, one or more of the plurality of surface portions 206 (labeled as 'a') may remain in the default positon, while one or more of the plurality of surface portions 206 (labeled as 'b') may be descended to form a holder to securely hold the object(s) upon the surface 204.

With reference to FIGS. 3A and 3B, in an exemplary embodiment, the surface configuration module 114 may send one or more actuation signals to mechanically ascend or descend one or more of the plurality of the surface portions 206. More specifically, upon the object profile determinant module 112 determining the physical profile of the object(s) placed upon the surface 204, the surface configuration module 114 may send the actuation signal(s) to one or more respective actuators of the plurality of actuators 304 that are operably connected to the one or more respective surface portions of the plurality of surface portions 206. In particular, the surface configuration module 114 may send the actuation signal(s) to one or more of the plurality of actuators 304 to ascend or descend the one or more respective surface portions of the plurality of surface portions 206 to accommodate the shape, width, height, length, etc., of the object(s) and securely hold the object(s) such as the portable electronic device 106 as represented in FIG. 3B.

In one embodiment, the plurality of actuators 304 may include respective separate motors (not shown) that are attached to each of the plurality of actuators 304 and mechanically operate each of the plurality of actuators 304. The plurality of actuators 304 may include a plurality of respective actuator pins 318 that may each be connected to the respective motor. The plurality of respective actuator pins 318 are extended (e.g., raised) outwards from each of the plurality of actuators 304 or retracted (e.g., lowered) inwards from each of the plurality of actuators 304. In one embodiment, a distal end of each of the plurality of respective actuator pins 318 may be maintained in a coiled state and secured to the motor within a housing (not shown) of each of the respective actuators of the plurality of actuators 304. The plurality of respective actuator pins 318 may be extended and rotated outwards to lengthen into an I-shaped column to ascend one or more respective surface portions of the plurality of surface portions 206. The plurality of respective actuator pins 318 may also be retracted and rotated inwards to shorten into the coiled state to descend one or more respective surface portions of the plurality of surface portions 206.

In some embodiments, the plurality of respective actuator pins 318 may be sectionalized within one or more sections (not shown) that may include ball bearings, and/or the like (not shown) that may be allow one or more of the plurality of respective actuator pins 318 to be flexibly bent upon extension or retraction. For example, as one or more of the plurality of respective actuator pins 318 is rotated to ascend one or more respective surface portions of the plurality of surface portions 206 above other surface portions of the plurality of surface portions 206 that are remaining within a default positon, one or more sections of the plurality of respective actuator pins 318 may flexibly bend towards to angle and ascend the one or more respective surface portions of the plurality of surface portions 206 towards one or more determined angles. Therefore, the angled surface portions may be angled outwards towards a driver's side seat and/or a passenger side seat to allow placement of additional unsecured objects on the surface 204 while the object(s) such as the portable electronic device 106 is securely held by the automated holder 104.

In an exemplary embodiment, a proximal end of each of the plurality of respective actuator pins 318 may include an attachment member (not shown). The attachment member may include, but is not limited to, one or more adhesive materials, one or more clasps, one or more screws, one or more brackets, one or more fasteners, and the like that attach to each of the plurality of respective actuator pins 318 and within a proximal end of each of the respective surface portions of the plurality of surface portions 206.

In one embodiment, upon the object profile determinant module 112 determining the physical profile of the object(s) placed upon the surface 204, the surface configuration module 114 may send the actuation signal(s) to one or more of the plurality of actuators 304. Upon receipt of the actuation signal(s), the one or more respective motors of the plurality of actuators 304 may cause one or more respective actuator pins of the plurality of respective actuator pins 318 to be extended outwards or retract inwards to consequently ascend or descend the one or more respective surface portions of the plurality of surface portions 206 by an amount determined by the surface configuration module 114 to securely hold the object(s).

As an illustrative example, upon the object profile determinant module 112 determining the physical profile of the portable electronic device 106 placed upon the surface 204, the surface configuration module 114 may send the one or more actuation signals for one or more of the plurality of actuators 304 to ascend or descend one or more of the respective surface portions of the plurality of surface portions 206 based on the determined physical profile of the portable electronic device 106. Upon receipt of the one or more actuation signals, the one or more respective motors of the plurality of actuators 304 may cause the one or more respective surface portions of the plurality of surface portions 206 to be ascended or descended by an amount determined by the surface configuration module 114 to accommodate the shape, width, height, length, etc., of the portable electronic device 106 to securely hold the portable electronic device 106 as illustrated in FIG. 3B.

Figure 3C:
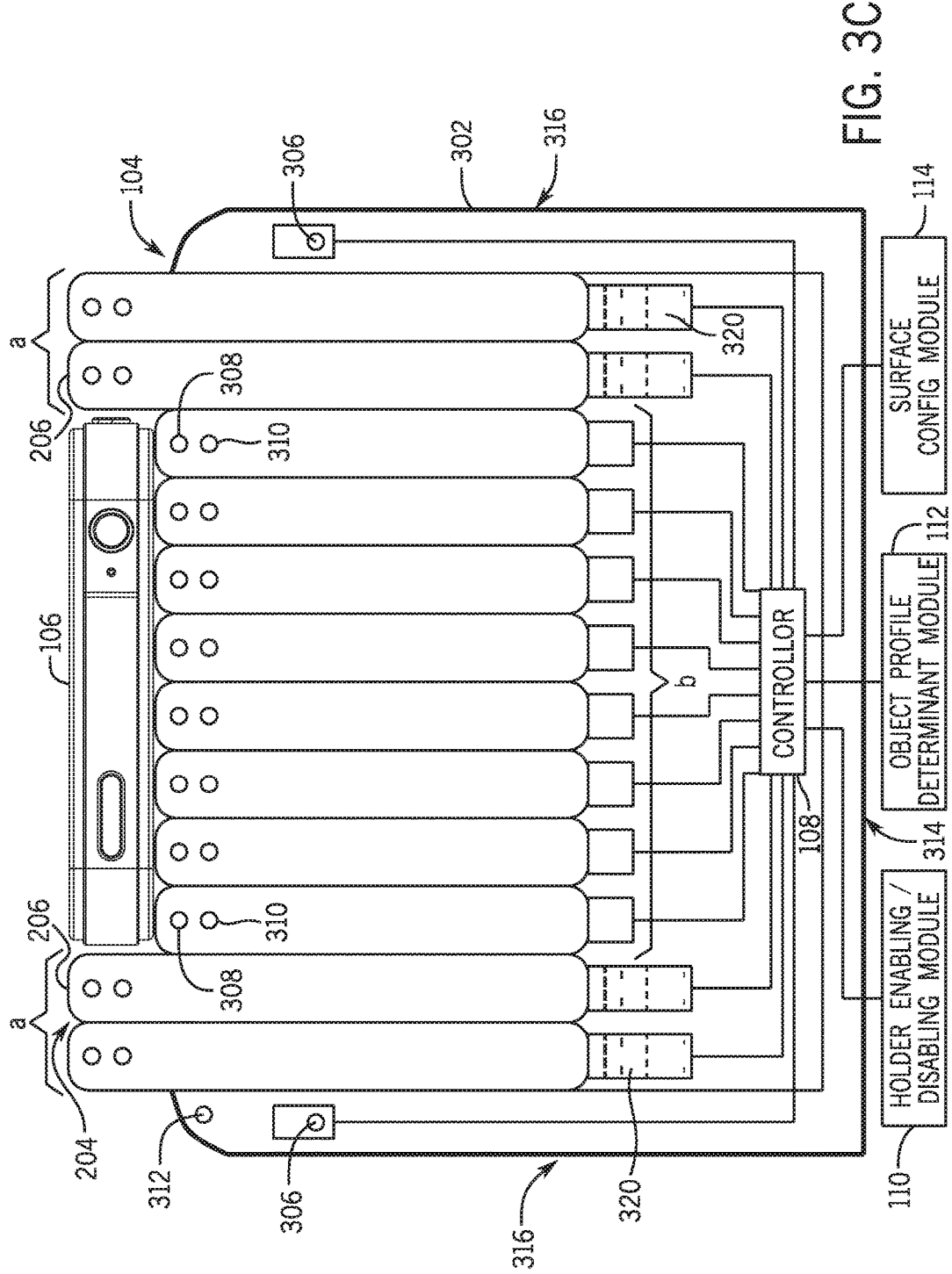
FIG. 3C is an enlarged schematic cross-section view of an exemplary embodiment of the automated holder of FIG. 2B in the enabled state to chemically ascend or descend one or more of the plurality of surface portions according to an exemplary embodiment.

FIG. 3C is an enlarged schematic cross-section view of an exemplary embodiment of the automated holder 104 of FIG. 2B in the enabled state to chemically ascend or descend one or more of the plurality of surface portions 206 according to an exemplary embodiment. FIG. 3C illustrates the portable electronic device 106 as the object being placed upon the surface 204 of the automated holder 104. However, it is appreciated that the disclosure related to FIG. 3C may apply to numerous types of objects that may be placed upon the surface 204 of the automated holder 104.

As shown, the automated holder 104 may securely hold the portable electronic device 106 in the enabled state by chemically ascending or descending one or more of the plurality of surface portions. As discussed above, within the enabled state, one or more of the plurality of surface portions 206 may remain in a default positon to keep the object(s) placed upon the surface 204, while one or more of the plurality of surface portions 206 may be ascended or descended to securely hold the object(s) such as the portable electronic device 106 upon the surface 204.

With reference to FIGS. 3A and 3C, in an exemplary embodiment, the controller 108 may chemically extend or descend one or more of the plurality of the surface portions 206 by sending an actuation signal to one or more respective actuators of the plurality of actuators 304 that are operably connected to the one or more respective surface portions of the plurality of surface portions 206. Within this embodiment, the plurality of surface portions 206 may each include a plurality of respective capsules 320 that may be externally attached to the plurality of the surface portions 206 or disposed within the plurality of surface portions 206 and may contain one or more types of chemical materials. The one or more types of chemical materials may include liquid, gaseous, and/or solid materials that be configured to expand or contract upon receiving specific electrical impulse signals. Consequently, when the one or more types of chemical materials expand within one or more capsules of the plurality of respective capsules 320, the one or more capsules of the plurality of respective capsules 320 and/or one or more respective surface portions of the plurality of surface portions 206 may expand causing the one or more respective surface portions of the plurality of surface portions 206 to be ascended. Conversely, when the one or more types of chemical materials contract within the one or more capsules of the plurality of respective capsules 320, the one or more capsules of the plurality of respective capsules 320 and/or the one or more respective surface portions of the plurality of surface portions 206 may contract causing the one or more respective surface portions of the plurality of surface portions 206 to be descended.

In one embodiment, upon the object profile determinant module 112 determining the physical profile of the object(s) placed upon the surface 204, the surface configuration module 114 may send the actuation signal(s) to one or more of the plurality of actuators 304. Upon receipt of the actuation signal(s), the one or more of the plurality of actuators 304 may send the one or more respective electrical impulse signals to one or more respective capsules of the plurality of respective capsules 320 to expand or contract the one or more types of chemical materials contained within the one or more respective capsules of the plurality of respective capsules 320 by an amount determined by the surface configuration module 114 to consequently ascend or descend the one or more respective surface portions of the plurality of surface portions 206 to securely hold the object(s).

As an illustrative example, upon the object profile determinant module 112 determining the physical profile of the portable electronic device 106 placed upon the surface 204, the surface configuration module 114 may send the actuation signal(s) for one or more of the plurality of actuators 304 to send the one or more respective electrical impulse signals to ultimately ascend or descend one or more of the respective surface portions of the plurality of surface portions 206 based on the expansion or contraction of the one or more types of chemical materials within one or more respective capsules of the plurality of respective capsules 320. The expansion of the one or more types of chemical materials may cause the one or more respective surface portions of the plurality of surface portions 206 to be ascended or descended by an amount determined by the surface configuration module 114 to accommodate the shape, width, height, length, etc., of the portable electronic device 106 to securely hold the portable electronic device 106 as illustrated in FIG. 3C.

With reference to again to FIG. 3A, in one embodiment, the one or more proximity sensors 306 of the automated holder 104 may emit an electromagnetic field to identify the object(s) (e.g., the portable electronic device 106) as an interfering proximity target object(s). In an exemplary embodiment, once the object(s) is sensed to be in close proximity to the surface 204 of the automated holder 104, the one or more proximity sensors 306 may be configured to send a proximity sensing data signal(s) to the controller 108 to be evaluated by the holder enabling/disabling module 110 of the controller 108. Upon receipt of the proximity sensing data signal(s) from the one or more proximity sensors 306, the holder enabling/disabling module 110 may evaluate the proximity sensing data signal(s) to determine that the object(s) is within a predetermined proximity (e.g., predetermined distance threshold) of the surface 204, and the controller 108 may enable the automated holder 104 based on a command provided by the holder enabling/disabling module 110.

In one embodiment, upon holding of the object(s) by the automated holder 104, the one or more proximity sensors 306 may emit the electromagnetic field to identify the user's arm/hand as the interfering proximity target object(s). In an exemplary embodiment, the one or more proximity sensors 306 may be configured to send the corresponding proximity sensing data signal(s) to the holder enabling/disabling module 110 if the user's arm/hand is sensed by the one or more proximity sensors 306 as being within the predetermined proximity of the surface 204. Upon receipt of the proximity sensing data signal(s), the holder enabling/disabling module 110 may evaluate the signal(s) to determine that the user's arm/hand is within the predetermined proximity of the surface 204 and may send a command to the surface configuration module 114 to disable the automated holder 104. By disabling the automated holder 104, the surface configuration module 114 may modify the configuration of the surface 204 to stop holding the object(s) by descending or ascending the one or more respective portions of the plurality of surface portions 206 that were previously ascended or descended to securely hold the object(s) into the default positon. Therefore, the user may be able to retrieve the object(s) with ease as it is no longer securely held on surface 204 of the automated holder 104 while it is in the disabled state, as represented in FIG. 3A.

In one embodiment, the one or more photoelectric sensors 308 of the automated holder 104 may be configured on or near one or more surface portions of the plurality of surface portions 206 of the surface 204. In one embodiment, the one or more photoelectric sensors 308 may be configured to sense when the object(s) is placed upon the surface 204 and may determine dimensions of the object(s) that is determined based on photoelectric sensing logic. Upon sensing the presence of the object(s) and determining the dimensions of the object(s) on the surface 204, the one or more photoelectric sensors 308 may send photoelectric sensing data signal(s) to the controller 108 to be evaluated by the holder enabling/disabling module 110 and/or the object profile determinant module 112.

In an exemplary embodiment, upon receipt of the photoelectric sensing data signal(s) by the controller 108, the holder enabling/disabling module 110 may evaluate the photoelectric sensing data signal(s) to determine that the object(s) is placed on the surface 204 and the holder enabling/disabling module 110 may provide the command to the controller 108 to enable the automated holder 104. In other words, the controller 108 may enable the automated holder 104 upon determining that the user has placed the object(s) upon the surface 204 of the automated holder 104. In one embodiment, upon the enabling of the automated holder 104 by the holder enabling/disabling module 110, and receiving of the photoelectric sensing data signal(s), the object profile determinant module 112 may evaluate the photoelectric sensing data signal(s) to determine the physical profile of the object(s) placed upon the surface 204 of the automated holder 104.

In another exemplary embodiment, the one or more weight sensors 310 of the automated holder 104 may be configured on or near one or more surface portions of the plurality of surface portions of the surface 204. In one embodiment, the one or more weight sensors 310 may be configured to sense a weight of the object(s) that are placed on the surface 204 and may evaluate the weight of each of the object(s) by utilizing a weight sensing logic to determine the dimensions of the object(s). Upon sensing the weight of the object(s) and determining the dimensions of the object(s) on the surface 204, the one or more weight sensors 310 may send weight sensing data signal(s) to the controller 108 to be evaluated by the holder enabling/disabling module 110 and/or the object profile determinant module 112.

In an exemplary embodiment, upon receipt of the weight sensing data signal(s), the holder enabling/disabling module 110 may evaluate the weight sensing data signal(s) to determine that the object(s) is placed on the surface 204, the holder enabling/disabling module 110 may provide the command to the controller 108 enable the automated holder 104. In other words, the controller 108 may enable the automated holder 104 upon determining that the user has placed the object(s) upon the surface 204 of the automated holder 104.

In one embodiment, upon the enabling of the automated holder 104 by the holder enabling/disabling module 110, and receiving of the weight sensing data signal(s), the object profile determinant module 112 may evaluate the weight sensing data signal(s) to determine the physical profile of the object(s) placed upon the surface 204 of the automated holder 104.

It is to be appreciated that the automated holder 104 may include additional sensors that may be utilized to send one or more signals to the controller 108 to indicate the presence of one or more object(s) that are placed near or upon the surface 204 of the automated holder 104. Additionally, it is to be appreciated that the holder enabling/disabling module 110 and the object profile determinant module 112 may be configured to receive and evaluate the one or more signals from the additional sensors to determine enablement of the automated holder 104 and/or the physical profile of the portable electronic device 106.

As discussed in more detail below, upon determining the physical profile of the portable electronic device 106, the object profile determinant module 112 may send a command signal(s) to the surface configuration module 114. The command signal(s) may include data that includes physical profile information that pertains to the dimensions, form factor, shape, size, etc., of the object(s) placed upon the surface 204 of the automated holder 104. In one embodiment, upon receipt of the physical profile information, the surface configuration module 324 may send one or more actuation signals to the one or more actuators of the plurality of actuators 304 to ascend or descend one or more surface portions of the plurality of surface portions 206 to provide an enclosure that securely holds the object(s) in place upon the remaining one or more surface portions of the plurality of surface portions 206, as illustrated in FIGS. 3B and 3C. More specifically, the surface configuration module 324 may evaluate the physical profile(s) of the object(s) and determine which of the one or more surface portions of the plurality of surface portions 206 will be ascended or descended to securely hold the object(s) in place upon the surface 204 of the automated holder 104 and will send the corresponding actuation signal(s) to ascend or descend the one or more respective surface portions of the plurality of surface portions 206.

Figure 4:
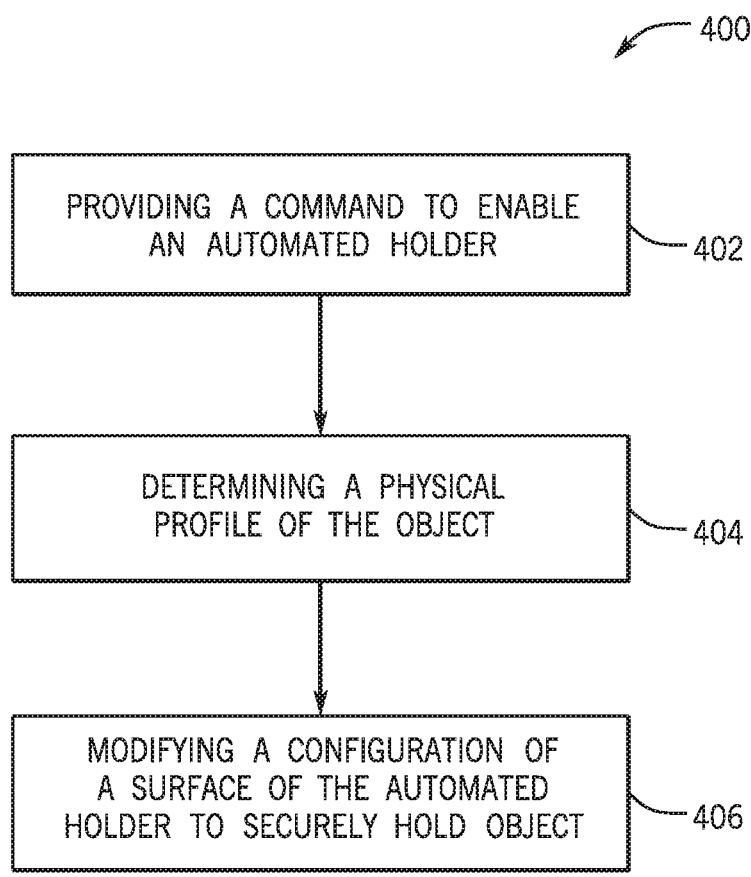
FIG. 4 is a flow diagram of an exemplary method for securely holding object(s) by the automated holder from the operating environment of FIGS. 1, 2B, 2C, and 3A-3C according to an exemplary embodiment.

FIG. 4 is a flow diagram of an exemplary method 400 for securely holding the object(s) by the automated holder 104 from the operating environment of FIGS. 1, 2B, 2C, and 3A-3C according to an exemplary embodiment. The method 400 begins at block 402, where the method 400 includes providing a command to enable the automated holder 104. As discussed above, the controller 108 may receive one or more various types of signals from one or more components of the vehicle 102 and/or one or more components of the automated holder 104 that are evaluated by the holder enabling/disabling module 110 to provide a command to controller 108 to enable the automated holder 104. In one embodiment, upon receiving the command to enable the automated holder 104, the controller 108 may send a signal to the power source to provide power to the components of the automated holder 104.

In one embodiment, the holder enabling/disabling module 110 may provide the command to enable the automated holder 104 based on a determination that an ON signal(s) have been received by the controller 108 from the head unit 120 of the vehicle 102 or from the ON/OFF switch button 312 of the automated holder 104. Upon receipt of the ON signal(s) by the controller 108, the enabling disabling module 322 may evaluate the signal(s) to determine that the user has inputted the ON/OFF user input button via the display unit 122 or the ON/OFF switch button 312 to turn on the automated holder 104 and may subsequently provide the command to enable the automated holder 104 to the controller 108.

In another embodiment, the holder enabling/disabling module 110 may provide the command to enable the automated holder 104 based on a determination that the portable electronic device 106 is connected to the vehicle 102 via a wireless connection to send and receive one or more data signals to and from the portable electronic device 106 to the head unit 120 of the vehicle 102. As discussed above, upon the portable electronic device 106 sending and receiving data to/from the vehicle communication system 124, the head unit 120 may send a device connection signal(s) to the controller 108. Upon receipt of the device connection signal(s) by the controller 108, the holder enabling/disabling module 110 may evaluate the signal(s) to determine that the portable electronic device 106 is connected to the vehicle 102 and may provide the command to the controller 108 to enable the automated holder 104.

In some embodiments, the holder enabling/disabling module 110 may provide the command to enable the automated holder 104 based on a determination that the ignition system of the vehicle 102 is enabled from the disabled state. As discussed above, upon determining that the vehicle ignition system is enabled from the disabled state, or disabled from the enabled state, the head unit 120 may send a corresponding vehicle enabling signal(s) to the controller 108. Upon receipt of the vehicle enabling signal(s), the holder enabling/disabling module 110 may evaluate the signal(s) to determine that the portable electronic device 106 is connected to the vehicle 102 and may provide the command to enable the automated holder 104 to the controller 108.

In one or more embodiments, the holder enabling/disabling module 110 may provide the command to enable the automated holder 104 based on the determination from the vehicle camera system 126 that the object(s) is being placed upon the surface 204 of the automated holder 104. As discussed above, upon the vehicle camera system 126 determining that the object(s) is being placed upon the surface 204, the vehicle camera system 126 may send image data signal(s) to the controller 108 that includes data pertaining to the object(s). Upon receipt of the vehicle enabling signal(s) by the controller 108, the holder enabling/disabling module 110 may evaluate the image data signal(s) to determine that the portable electronic device 106 is being placed/is placed upon the surface 204 and may provide the command to the controller 108 to enable the automated holder 104.

In alternate embodiments, the holder enabling/disabling module 110 may provide the command to enable the automated holder 104 based on the determination from the vehicle camera system 126 that the occupant(s) is present within the vehicle 102. As discussed above, upon the vehicle camera system 126 determining that the occupant(s) is present within the vehicle 102, the vehicle camera system 126 may send the image data signal(s) to the controller 108 that includes data pertaining to the presence of the occupant(s). Upon receipt of the vehicle enabling signal(s) by the controller 108, the holder enabling/disabling module 110 may evaluate the signal(s) to determine that the occupant(s) are seated within the vehicle 102 and may provide the command to the controller 108 to enable the automated holder 104.

In an exemplary embodiment, the holder enabling/disabling module 110 may provide the command to enable the automated holder 104 based on the determination by the one or more proximity sensors 306 of the automated holder 104 that the object(s) is sensed to be in the predetermined proximity to the surface 204 of the automated holder 104. As discussed above, the one or more proximity sensors 306 may be configured to send the proximity sensing data signal(s) to the controller 108. Upon receipt of the proximity sensing data signal(s) by the controller 108, the holder enabling/disabling module 110 may evaluate the signal(s) to determine that the object(s) is within the predetermined proximity of the surface 204, and the holder enabling/disabling module 110 may provide the command to the controller 108 to enable the automated holder 104.

In another embodiment, the holder enabling/disabling module 110 may provide the command to enable the automated holder 104 based on the determination by the one or more photoelectric sensors 308 of the automated holder 104 that the object(s) is sensed to be placed upon the surface 204 of the automated holder 104. As discussed above, the one or more photoelectric sensors 308 may be configured to send the photoelectric sensing data signal(s) to the controller 108. Upon receipt of the photoelectric sensing data signal(s) by the controller 108, the holder enabling/disabling module 110 may evaluate the signal(s) to determine that the object(s) is being placed upon the surface 204, and the holder enabling/disabling module 110 may provide the command to the controller 108 to enable the automated holder 104.

In some embodiments, the holder enabling/disabling module 110 may provide the command to enable the automated holder 104 based on the determination by the one or more weight sensors 310 of the automated holder 104 the weight of the object(s) being sensed as being placed upon the surface 204 of the automated holder 104. As discussed above, the one or more weight sensors 310 may be configured to send weight sensing data signal(s) to the controller 108. Upon receipt of the weight sensing data signal(s) by the controller 108, the holder enabling/disabling module 110 may evaluate the signal(s) to determine that the object(s) is being placed upon the surface 204, and the holder enabling/disabling module 110 may provide the command to the controller 108 to enable the automated holder 104.

With continued reference to FIG. 4, upon the holder enabling/disabling module 110 providing the command to enable the automated holder 104 (at block 402), at block 404, the method 400 includes determining a physical profile of the object placed upon a surface of the automated holder 104. In an exemplary embodiment, upon the holder enabling/disabling module 110 providing the command to enable the automated holder 104, the holder enabling/disabling module 110 may send a command signal to the object profile determinant module 112. Upon receipt of the command signal, the object profile determinant module 112 may evaluate various types of signals received from one or more components of the vehicle 102 and/or one or more components of the automated holder 104 to determine the physical profile of the object placed upon the surface 204.

More specifically, the object profile determinant module 112 may evaluate one or more types of data with respect to the physical dimensions of the object(s) determined from the one or more various types of received signals. Upon evaluation of the one or more types of data, the object profile determinant module 112 may integrate the one or more types of data into the physical profile of the object(s) to be further utilized to modify the configuration of the surface 204. In one or more embodiments, the object profile determinant module 112 may utilize known sensor/data fusion techniques/algorithms, such as for example Bayesian networks to process and integrate the one or more types of data into a consolidated data package in the form of the physical profile of the object(s). As discussed above, the physical profile of the object(s) may include information pertaining to one or more of the length, width, height, depth, weight, density, form factor, and/or additional data pertaining to the shape and/or physical configuration of the object(s).

In an exemplary embodiment, the object profile determinant module 112 may determine the physical profile of the object(s) based on the reception of data from one or more of the vehicle camera system 126, the one or more photoelectric sensors 308 and/or the one or more weight sensors 310. As discussed above, the vehicle camera system 126 may utilize the camera logic to determine the physical dimensions of the object(s) placed upon the surface 204 and the vehicle camera system 126 may send image data signal(s) to the controller 108 to be evaluated by the object profile determinant module 112. The image data signal(s) may include data that pertaining to the physical dimensions of object(s) included within the one or more images. Upon receipt of the image data signal(s) by the controller 108, the object profile determinant module 112 may evaluate the data pertaining to the physical dimensions of the object(s) included within the image data signal(s) and may determine the physical profile of the object(s) based on the data from the image data signal(s). In one embodiment, the object profile determinant module 112 may integrate the data included from the image data signal(s) with data included within the respective signals received from the one or more photoelectric sensors 308 and/or the one or more weight sensors 310 to determine the physical profile of the object(s).

As discussed, the one or more photoelectric sensors 308 may be configured to sense when the object(s) is placed upon the surface 204 and may determine dimensions of the object(s) based on photoelectric sensing logic. Upon determining the dimensions of the object(s) on the surface 204, the one or more photoelectric sensors 308 may send the photoelectric sensing signal(s) that include data pertaining to the physical dimensions of the sensed object(s) to the controller 108. Upon receipt of the photoelectric sensing signal(s) by the controller 108, the object profile determinant module 112 may evaluate data pertaining to the physical dimensions of the object(s) included within the photoelectric sensing data signal(s) and may determine the physical profile of the object(s) based on the data from the photoelectric sensing data signal(s). In one embodiment, the object profile determinant module 112 may integrate the data included from the photoelectric sensing signal(s) with data included within the image data signal(s) received from the vehicle camera system 126 and/or signal(s) received the one or more weight sensors 310 to determine the physical profile of the object(s).

As also discussed, the one or more weight sensors 310 may be configured to sense the weight of object(s) being placed upon the surface 204 and may determine the physical dimensions of the object(s) based on weight sensing logic. Upon determining the physical dimensions of the object(s) on the surface 204, the one or more weight sensors 310 may send the weight sensing data signal(s) to the controller 108. Upon receipt of the weight sensing data signal(s) by the controller 108, the object profile determinant module 112 may evaluate data pertaining to the physical dimensions of the object(s) included within the weight sensing data signal(s) and may determine the physical profile of the object(s) based on the data from the weight sensing data signal(s). In one embodiment, the object profile determinant module 112 may integrate the data included from the weight sensing data signal(s) with data included within the photoelectric sensing signal(s) received from the one or more photoelectric sensors 308 and/or the image data signal(s) from the vehicle camera system 126 to determine the physical profile of the object(s).

With continued reference to FIG. 4, upon object profile determinant module 112 determining the physical profile of the object(s) placed upon the surface 204 of the automated holder 104 (at block 404), at block 406, the method 400 includes modifying a configuration of a surface 204 of the automated holder 104 to securely hold the object. In one embodiment, upon determining the physical profile of the object(s) placed upon the surface 204, the object profile determinant module 112 may send a command signal that includes data pertaining to the physical profile of the object(s) to the surface configuration module 114. Upon receipt of the command signal, the surface configuration module 114 may evaluate the data pertaining to the physical profile of the object(s) and may control the plurality of actuators 304 to ascend or descend one or more surface portions of the plurality of surface portions 206 of the automated holder 104 to securely hold the object(s) upon the surface 204.

In an exemplary embodiment, the surface configuration module 114 may evaluate the physical profile of the object(s) and determine an amount of ascension and/or an amount of descension that is to be applied to one or more specific surface portions of the plurality of surface portions 206 of the automated holder 104 to accommodate the shape, width, height, length, etc., of the object(s) and securely hold the object(s) upon the surface 204.

In one embodiment, upon determining the amount of ascension and/or the amount of descension that is to be applied to the one or more specific surface portions of the plurality of surface portions 206, the surface configuration module 114 may send one or more actuation signals to the one or more of the plurality of actuators 304 to mechanically ascend or descend one or more of the plurality of the surface portions 206. Based on the receipt of the one or more actuation signals, one or more of the plurality of respective actuator pins 318 may be mechanically extended outwards or retracted inwards from one or more respective actuators of the plurality of actuators 304. Consequently, the one or more respective actuators may ascend or descend one or more respective surface portions of the plurality of surface portions 206 at one or more positions to accommodate the shape, width, height, length, etc. of the object(s) and securely hold the object(s) upon the surface 204, as represented in FIG. 3B.

In an alternate embodiment, upon determining the amount of ascension and/or the amount of descension that is to be applied to the one or more specific surface portions of the plurality of surface portions 206, the surface configuration module 114 may send one or more actuation signals to the one or more of the plurality of actuators 304 to chemically ascend or descend one or more of the plurality of surface portions 206. Based on the receipt of the one or more actuation signals, the plurality of actuators 304 may send the one or more respective electrical impulse signals to one or more of the plurality of respective capsules 320 to expand or contract the one or more types of chemical materials contained within the respective capsules to consequently ascend or descend the one or more respective surface portions of the plurality of surface portions 206 at one or more positions to accommodate the shape, width, height, length, etc., of the object(s) and securely hold the object(s) upon the surface 204, as represented in FIG. 3C.

In one or more embodiments, upon modifying the configuration of the surface 204 of the automated holder 104 to securely hold the object(s), the object profile determinant module 112 may send a corresponding command signal(s) to the holder enabling/disabling module 110 to indicate that the surface 204 has been modified. The holder enabling/disabling module 110 may interpret the corresponding command signal(s) to be prepared to accept signal(s) that may indicate that the automated holder 104 is to be disabled.

In one embodiment, the holder enabling/disabling module 110 may provide the command to disable the automated holder 104 based on a determination that an OFF signal(s) have been received by the controller 108 from the head unit 120 of the vehicle 102 or from the ON/OFF switch button 312 of the automated holder 104. Upon receipt of the OFF signal(s) by the controller 108, the enabling disabling module 322 may evaluate the signal(s) to determine that the user has inputted the ON/OFF user input button via the display unit 122 or the ON/OFF switch button 312 to turn off the automated holder 104 and may provide the command to disable the automated holder 104 to the surface configuration module 114 and the controller 108.

In another embodiment, the holder enabling/disabling module 110 may provide the command to disable the automated holder 104 based on a determination that the portable electronic device 106 is no longer connected to the vehicle 102 via the wireless connection. In some embodiments, upon the portable electronic device 106 sending and receiving data to/from the vehicle communication system 124 the head unit 120 may send a device disconnection signal(s) to the holder enabling/disabling module 110 when the communication device 116 of the portable electronic device 106 no longer communicates with (e.g., disconnects from) the vehicle communication system 124. Upon receipt of the device disconnection signal(s) by the controller 108, the holder enabling/disabling module 110 may evaluate the signal(s) to determine that the portable electronic device 106 is disconnected to the vehicle communication system 124 of the vehicle 102 and may provide the command to disable the automated holder 104 to the surface configuration module 114 and the controller 108.

In some embodiments, the holder enabling/disabling module 110 may provide the command to disable the automated holder 104 based on a determination that the ignition system of the vehicle 102 is disabled from the enabled state. As discussed above, upon determining that the vehicle ignition system is disabled from the enabled state, the head unit 120 may send a corresponding vehicle enabling signal(s) to the holder enabling/disabling module 110. Upon receipt of the corresponding vehicle enabling signal(s), the holder enabling/disabling module 110 may evaluate the signal(s) to determine that the vehicle 102 has been disabled and may provide the command to disable the automated holder 104 to the surface configuration module 114 and the controller 108.

In one or more embodiments, the holder enabling/disabling module 110 may provide the command to disable the automated holder 104 based on the determination from the vehicle camera system 126 that the object(s) placed upon the surface 204 of the automated holder 104 are being removed from the surface 204. The vehicle camera system 126 may be configured to utilize camera logic to determine that the object(s) is being removed from the surface 204 by the user. Upon making such a determination, the vehicle camera system 126 may send the image data signal(s) to the controller 108 that includes data pertaining to the removal of the object(s). Upon receipt of the corresponding image data signals by the controller 108, the holder enabling/disabling module 110 may evaluate the signal(s) to determine that the user is in the process of removing the object(s) from the surface 204 and may provide the command to disable the automated holder to the surface configuration module 114 and the controller 108.

In another embodiment, the holder enabling/disabling module 110 may provide the command to disable the automated holder 104 based on the determination by the one or more proximity sensors 306 of the automated holder 104 that the user's arm/hand is sensed to be in close proximity to the surface 204 of the automated holder 104. As discussed above, the one or more proximity sensors 306 may be configured to send the proximity sensing data signal(s) to the controller 108. Upon receipt of the proximity sensing data signal(s) by the controller 108, the holder enabling/disabling module 110 may evaluate the signal(s) to determine that the user's arm/hand is sensed is in the predetermined proximity of the surface 204 and therefore the user is in the process of removing the object(s) from the surface 204. The holder enabling/disabling module 110 may provide the command to disable the automated holder 104 to the surface configuration module 114 and the controller 108.

In an exemplary embodiment, upon receiving the command to disable the automated holder 104, the surface configuration module 114 may send one or more actuation signals to the one or more of the plurality of actuators 304 to descend or ascend the one or more respective portions of the plurality of surface portions 206 that were previously ascended or descended to securely hold the object(s) upon the surface 204. Consequently, the plurality of surface portions 206 may all be put into the default position. Therefore, the user may be able to retrieve the object(s) with ease as it is no longer securely held on surface 204 while it is in its default position, as represented in FIG. 3A. In one embodiment, upon receiving the command to disable the automated holder 104 and confirming that the plurality of surface portions 206 have been put into the default position based on the actuation signal(s) provided by the surface configuration module 114, the controller 108 may send a signal to the power source to stop providing power to the components of the automated holder 104 thereby disabling the automated holder 104.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also indented to be encompassed by the following claims.

The invention claimed is:

1. A method for securely holding an object in a vehicle comprising:
providing a command to enable an automated holder;
determining a physical profile of the object placed upon a surface of the automated holder upon enablement of the automated holder, wherein determining the physical profile includes evaluating information pertaining to physical dimensions of the object; and
modifying a configuration of the surface of the automated holder to securely hold the object based on the physical profile of the object.

2. The method of claim 1, wherein providing the command to enable the automated holder includes sensing a presence of the object to be within a predetermined proximity to the surface of the automated holder by at least one proximity sensor and providing the command to provide power to at least one component of the automated holder.

3. The method of claim 1, wherein providing the command to enable the automated holder includes sensing a presence of the object placed on the surface of the automated holder by at least one of: at least one photoelectric sensor, and at least one weight sensor and providing the command to provide power to at least one component of the automated holder.

4. The method of claim 1, wherein determining the physical profile of the object placed upon the surface includes evaluating: data provided by a vehicle camera system that pertains to the physical dimensions of the object, data provided by at least one photoelectric sensor that pertains to the physical dimensions of the object, and data provided by the at least one weight sensor that pertains to the physical dimensions of the object.

5. The method of claim 4, wherein determining the physical profile of the object placed upon the surface includes integrating the data provided by the vehicle camera system, the data provided by the at least one photoelectric sensor, and the data provided by the at least one weight sensor to determine the physical profile of the object, wherein the physical profile of the object includes data that is indicative of at least one of: a length of the object, a width of the object, a height of the object, a depth of the object, a weight of the object, a density of the object, a form factor of the object, data pertaining to a shape of the object, and data pertaining to a physical configuration of the object.

6. The method of claim 5, wherein modifying the configuration of the surface includes evaluating the physical profile of the object and determining at least one of: an amount of ascension that is to be applied to at least one portion of the surface based on the physical profile, and an amount of descension that is to be applied to at least one portion of the surface based on the physical profile.

7. The method of claim 6, wherein modifying the configuration of the at least one portion of the surface includes at least one of: sending at least one actuation signal to at least one actuator connected to the at least one portion of the surface to mechanically ascend the at least one portion of the surface and sending at least one signal to the at least one actuator configured connected to the at least one portion of the surface to mechanically descend the at least one portion of the surface.

8. The method of claim 6, wherein modifying the configuration of the at least one portion of the surface includes at least one of: sending at least one signal to at least one actuator connected to the at least one portion of the surface to chemically ascend the at least one portion of the surface and sending the at least one signal to the at least one actuator configured under the at least one portion of the surface to chemically descend the at least one portion of the surface.

9. A system for securely holding an object in a vehicle comprising:
   a memory storing instructions when executed by a processor cause the processor to:
   provide a command to enable an automated holder;
   determine a physical profile of the object placed upon a surface of the automated holder upon enablement of the automated holder, wherein determining the physical profile includes evaluating information pertaining to physical dimensions of the object; and
   modify a configuration of the surface of the automated holder to securely hold the object based on the physical profile of the object.

10. The system of claim 9, wherein providing the command to enable the automated holder includes sensing a presence of the object to be within a predetermined proximity to the surface of the automated holder by at least one proximity sensor and providing the command to provide power to at least one component of the automated holder.

11. The system of claim 9, wherein providing the command to enable the automated holder includes sensing a presence of the object placed on the surface of the automated holder by at least one of: at least one photoelectric sensor, and at least one weight sensor and providing the command to provide power to at least one component of the automated holder.

12. The system of claim 9, wherein determining the physical profile of the object placed upon the surface includes evaluating: data provided by a vehicle camera system that pertains to the physical dimensions of the object, data provided by at least one photoelectric sensor that pertains to the physical dimensions of the object, and data provided by the at least one weight sensor that pertains to the physical dimensions of the object.

13. The system of claim 12, wherein determining the physical profile of the object placed upon the surface includes integrating the data provided by the vehicle camera system, the data provided by the at least one photoelectric sensor, and the data provided by the at least one weight sensor to determine the physical profile of the object, wherein the physical profile of the object includes data that is indicative of at least one of: a length of the object, a width of the object, a height of the object, a depth of the object, a weight of the object, a density of the object, a form factor of the object, data pertaining to a shape of the object, and data pertaining to a physical configuration of the object.

14. The system of claim 13, wherein modifying the configuration of the surface includes evaluating the physical profile of the object and determining at least one of: an amount of ascension that is to be applied to at least one portion of the surface based on the physical profile, and an amount of descension that is to be applied to at least one portion of the surface based on the physical profile.

15. The system of claim 14, wherein modifying the configuration of the at least one portion of the surface includes at least one of: sending at least one actuation signal to at least one actuator connected to the at least one portion of the surface to mechanically ascend the at least one portion of the surface and sending at least one signal to the at least one actuator configured connected to the at least one portion of the surface to mechanically descend the at least one portion of the surface.

16. The system of claim 14, wherein modifying the configuration of the at least one portion of the surface includes at least one of: sending at least one signal to at least one actuator connected to the at least one portion of the surface to chemically ascend the at least one portion of the surface and sending the at least one signal to the at least one actuator configured under the at least one portion of the surface to chemically descend the at least one portion of the surface.

17. A method for securely holding a portable electronic device in a vehicle comprising:
   providing a command to enable an automated holder;
   determining a physical profile of the portable electronic device placed upon a surface of the automated holder upon enablement of the automated holder, wherein determining the physical profile includes evaluating information pertaining to physical dimensions of the portable electronic device; and
   modifying a configuration of the surface of the automated holder to securely hold the portable electronic based on the physical profile of the portable electronic device.

18. The method of claim 17, wherein providing the command to enable the automated holder includes determining a connection between the portable electronic device and a communication device of the vehicle and providing the command to provide power to at least one component of the automated holder.

19. The method of claim 18, further including providing the command to disable the automated holder, wherein providing the command to disable the automated holder includes determining a disconnection between the portable electronic device and the vehicle communication system of the vehicle and providing the command to stop providing the power to the at least one component of the automated holder.

20. The method of claim 17, wherein modifying the configuration of the surface includes evaluating the physical profile of the portable electronic device and determining at least one of: an amount of ascension that is to be applied to at least one portion of the surface, and an amount of descension that is to be applied to at least one portion of the surface, wherein modifying the configuration of the at least one portion of the surface includes at least one of: sending at least one actuation signal to at least one actuator connected to the at least one portion of the surface to mechanically ascend the at least one portion of the surface and sending at least one signal to the at least one actuator configured connected to the at least one portion of the surface to chemically ascend the at least one portion of the surface.

* * * * *